US006861152B2

(12) United States Patent
Harvey et al.

(10) Patent No.: US 6,861,152 B2
(45) Date of Patent: Mar. 1, 2005

(54) PRESSURE SENSITIVE ADHESIVES

(75) Inventors: Raymond Scott Harvey, Worthington, OH (US); Harvey Joseph Richards, deceased, late of Columbus, OH (US); by Corlyss J. Richards, legal representative, Columbus, OH (US)

(73) Assignee: Ashland Inc., Dublin, OH (US)

( * ) Notice: Subject to any disclaimer, the term of this patent is extended or adjusted under 35 U.S.C. 154(b) by 0 days.

(21) Appl. No.: 10/436,780

(22) Filed: May 13, 2003

(65) Prior Publication Data

US 2004/0096685 A1 May 20, 2004

Related U.S. Application Data

(62) Division of application No. 10/010,170, filed on Nov. 13, 2001, now Pat. No. 6,590,031, which is a continuation of application No. 09/290,159, filed on Apr. 12, 1999, now abandoned.

(51) Int. Cl.[7] .............................................. B32B 27/08
(52) U.S. Cl. ....................... 428/516; 428/514; 428/520; 428/522
(58) Field of Search ................................ 428/514, 516, 428/520, 522

(56) References Cited

U.S. PATENT DOCUMENTS

| | | | |
|---|---|---|---|
| 5,286,843 A | 2/1994 | Wood | 528/482 |
| 5,332,854 A | 7/1994 | Yokota et al. | 558/33 |
| 5,536,811 A | 7/1996 | Wood | 528/482 |
| 5,620,796 A | 4/1997 | Kawabata et al. | 428/355 AC |
| 5,663,241 A | 9/1997 | Takamatsu et al. | 525/328.6 |
| 5,885,708 A | 3/1999 | Lu et al. | 428/353 |
| 5,889,105 A | 3/1999 | Satsuma et al. | 524/560 |
| 5,916,693 A | 6/1999 | Van Rheenen | 428/516 |
| 5,928,783 A | 7/1999 | Phan et al. | 428/355 EN |
| 6,048,611 A | 4/2000 | Lu et al. | 428/355 AC |
| 6,489,387 B2 | 12/2002 | Mallya et al. | 524/394 |

FOREIGN PATENT DOCUMENTS

| | | | | |
|---|---|---|---|---|
| EP | 0 845 518 | 6/1998 | | C09J/133/06 |
| WO | 98/44064 | 10/1998 | | C09J/133/08 |

Primary Examiner—Helen L. Pezzuto
(74) Attorney, Agent, or Firm—Martin Connaughton

(57) ABSTRACT

The present invention relates to pressure sensitive adhesives based on aqueous latex emulsions processes for their preparation and laminates prepared there from. The pressure sensitive adhesives exhibit excellent adhesion in hot water environments and resistance to water-whitening.

11 Claims, 2 Drawing Sheets

PRESSURE SENSITIVE ADHESIVES

CROSS-REFERENCE TO RELATED APPLICATIONS

This is a divisional application of U.S. Ser. No. 10/010,170, filed Nov. 13, 2001 now U.S. Pat. No. 6,590,031; which is a continuation of U.S. Ser. No. 09/290,159, filed Apr. 12, 1999; now abandoned.

STATEMENT REGARDING FEDERALLY SPONSORED RESEARCH (Not Applicable)

BACKGROUND OF THE INVENTION

The present invention relates to pressure sensitive adhesives based on aqueous latex emulsions and processes for the preparation of the adhesives. Pressure sensitive adhesives prepared according to the present invention have mean particle diameter sizes of less than or equal to about 100 nm and narrow particle size distributions. These pressure sensitive adhesives are particularly suitable for applications that require that the pressure sensitive adhesive maintain adhesion between the substrate and facestock when subjected to hot water spraying or immersion. In addition, the adhesives exhibit resistance to water-whitening or "blush". Hot water adhesion is required in applications such as bottle labels where the bottles are subjected to hot water spraying in washing operations. In general, resistance to water-whitening is desirable anywhere a pressure sensitive adhesive with transparent facestock or substrate is subjected to water or high humidity. Examples include labels on the sides of trucks, signs and bottles.

Methods of providing water-whitening resistant latex emulsions for use in pressure sensitive adhesives are disclosed in the art. U.S. Pat. Nos. 5,286,843 and 5,536,811 disclose a process for improving the water-whitening resistance of pressure sensitive adhesives containing an aqueous latex emulsion and water soluble ions by removing the water soluble ions and adjusting the pH to at least about 6. The patents disclose that water soluble ions may be removed by a number of techniques including centrifugation, dialysis, precipitation and deionization with ion exchange resins. The preferred method of removing the water soluble ions is to contact the aqueous latex emulsion, the formulated pressure sensitive adhesive containing the aqueous emulsion or both with an ion exchange resin. International Application WO 97/11996 discloses a process for preparing hot water-whitening resistant latex emulsions useful in pressure sensitive adhesive compositions. The process involves copolymerizing a monomer mixture containing at least one alkyl acrylate ester of an alcohol containing at least 4 carbon atoms, at least one polar co-monomer and at least one partially soluble co-monomer present in an amount of at least about 7 weight %. Polymerization is carried out in the presence of at least one nonionic surfactant containing at least 8 moles of ethylene oxide and at least one anionic surfactant containing up to about 10 moles of ethylene oxide. The polymerization product is neutralized to produce an emulsion having a pH greater than 7 and containing particles having a volume average particle size diameter up to about 165 nm. An electrolyte may be added subsequent to polymerization to stabilize opacity of a film cast from the emulsion. International Application WO 98/44064 discloses inherently tacky pressure sensitive adhesives prepared by emulsion polymerization of at least one monomer mixture comprising; at least one alkyl acrylate, the alkyl group of which has from 4 to 12 carbon atoms; at least one unsaturated carboxylic acid containing from about 3 to 5 carbon atoms and one styrenic monomer; wherein the particles have a mean diameter of 300 nm or less. The publication discloses a single stage preparation of aqueous acrylic emulsions in examples 4D, 4E, 4F, 4G and 4H with average particle sizes ranging from 245 nm to 139 nm. Each of the examples discloses the use of silane crosslinkers to improve blush resistance. The reference discloses a preferred method of preparation which yields adhesives resistant to water-whitening and involves a sequential polymerization of a first and second monomer charge. None of the above references disclose a pressure sensitive adhesive that maintains adhesion in hot water environments and is resistant to water-whitening.

BRIEF SUMMARY OF THE INVENTION

It has been found that pressure sensitive adhesives that maintain adhesion in hot water environments in addition to exhibiting enhanced resistance to water-whitening can be prepared using an aqueous latex emulsion prepared from a monomer mixture consisting essentially of;

a) at least one alkylacrylate having at least 4 carbon atoms in the alkyl chain,
 b) at least one ethylenically unsaturated carboxylic acid or its corresponding anhydride,
 c) at least one styrenic monomer.

The monomer mixtures are polymerized using single stage aqueous latex emulsion techniques. The polymerization is carried out in the presence of at least one anionic surfactant and a redox type free radical initiator system. The present invention further relates to methods of preparation of the pressure sensitive adhesives and laminates prepared using these pressure sensitive adhesives. When prepared using the disclosed monomer mixture, anionic surfactant and redox initiator system, the aqueous latex emulsion has polymer particles with an mean particle size diameter of less than or equal to about 100 nm. In addition, when prepared as described the measured particle size does not increase during the polymerization process at the expected rate, but rather maintains a relatively flat particle growth curve, while still yielding latex emulsions with relatively narrow particle size distributions. Typically, the particle size distribution exhibits a mean/median ratio of less than about 1.05.

Pressure sensitive adhesives of the present invention are useful in clear label applications, marking films, etc. When prepared according to the invention pressure sensitive adhesives maintain adhesion in hot water environments and are resistant to water-whitening for at least 12 hours and preferrably for at least 24 hours.

DETAILED DESCRIPTION OF THE INVENTION

Figure 1:
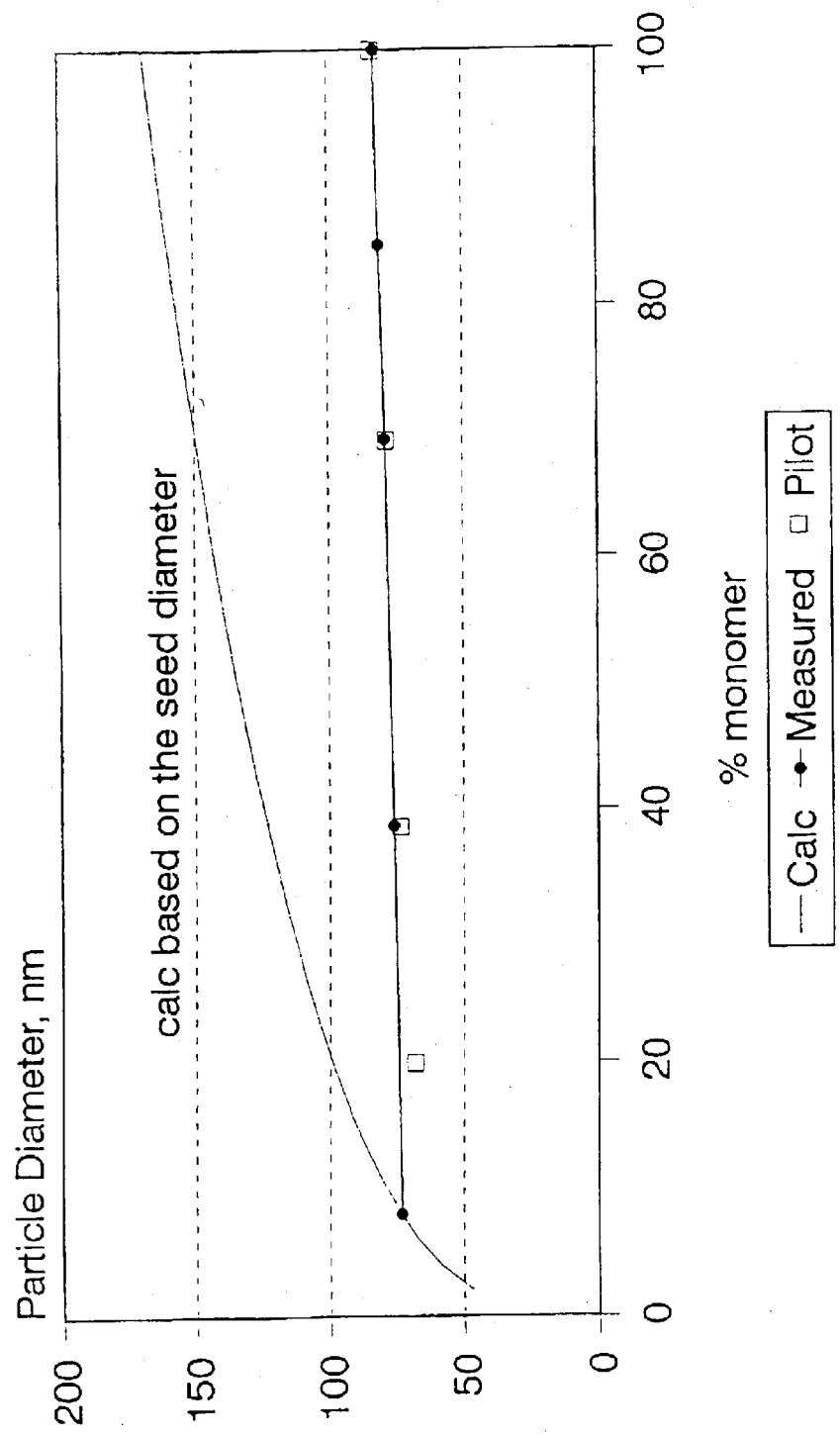
FIG. 1-is a graph comparing the measured particle growth in the aqueous latex emulsion of both lab and plantsize batches corresponding to Example 4 compared with the predicted particle size growth calculated using the initial measured particle diameter.

Pressure sensitive adhesives that are sufficiently versatile to wet out and coat a variety of substrate (adherend) surfaces; provide adequate adhesive characteristics such as tack, peel adhesion and shear resistance; and maintain adhesion in hot water environments in addition to exhibiting enhanced resistance to water-whitening are based on aqueous latex emulsions prepared from monomer mixtures, consisting essentially of;

A) at least one alkyl acrylate having at least 4 carbon atoms in the alkyl group, B) at least one ethylenically unsaturated carboxylic acid or its corresponding anhydride, C) at least one styrenic monomer.

The polymerization is carried out in the presence of an anionic surfactant or mixture of anionic surfactants. A redox type free radical initiator system is used in an amount sufficient to promote free radical polymerization of the monomers. Once the polymerization is complete it may be desirable to adjust the pH of the latex emulsion in order to enhance its stability. Other ingredients commonly used in the preparation of aqueous latex emulsions such as buffering agents, chain transfer agents, and the like may be present. General latex technology is discussed in, Kirk-Othmer, Encyclopedia of Technology [4thEd.], vol.15, p.51–65; which is hereby incorporated by reference. In addition to the aqueous latex emulsion, the pressure sensitive adhesive-may also contain additional components such as, biocides, wetting agents, defoamers, tackifiers, etc.

The monomers used to prepare the aqueous lattices include alkyl acrylates, ethylenically unsaturated carboxylic acids and their corresponding anhydrides and styrenic monomers.

Alkyl acrylates are alkyl esters of acrylic or methacrylic acid having at least 4 carbon atoms in the alkyl portion of the molecule. Examples include butyl acrylate, isobutyl acrylate, heptyl acrylate, octyl acrylate, isooctyl acrylate, 2-ethylhexyl acrylate, and isodecyl acrylate. A single alkyl acrylate or mixtures of more than one alkyl acrylate can be used. A preferred alkyl acrylate is 2-ethylhexyl acrylate. The alkyl acrylate monomers are present in the monomer mixture in an amount from about 50 wt % to about 90 wt % and more preferably from about 60 wt % to about 65 wt % based on the total weight of the monomer mixture.

Examples of ethylenically unsaturated carboxylic acids and their corresponding anhydrides used in the present invention include acrylic acid, methacrylic acid, maleic acid, fumaric acid, itaconic acid, beta-carboxyethyl acrylate and maleic anhydride. A single ethylenically unsaturated carboxylic acid or its corresponding anhydride or mixtures thereof can be used. A preferred carboxylic acid is beta-carboxyethyl acrylate. The ethylenically unsaturated carboxylic acids or their corresponding anhydrides are present in the monomer mixture in amounts from about 5 wt % to about 10 wt %, more preferably from about 6 wt % to about 8 wt % based on the total weight of the monomer mixture.

Examples of styrenic monomers used in the present invention include styrene, t-butyl styrene, dimethyl styrene, and vinyl toluene. A preferred monomer is styrene. The styrenic monomers are present in the monomer mixture in amounts from about 20 wt % to about 40 wt %, more preferably from about 28 wt % to about 34 wt % based on the total weight of the monomer mixture.

Surfactants suitable for use in the present invention are anionic surfactants. Examples of anionic surfactants include ammonium salts of nonylphenol ethoxylated sulfates such as ABEX EP-110 (30% active) or ABEX EP-120; lauryl ether sulfates such as Disponil™FES-32 or FES-993; sulfosuccinates such as Aerosoltm OT-75 or OT-501 and the like. A preferred anionic surfactant is ABEX EP-110. A single anionic surfactant or mixture of anionic surfactants can be used. Typically, less than 4 wt % of the anionic surfactant based on the total weight of the latex, is used.

A redox type free radical initiator system is used to promote polymerization of the monomers. The initiator is peroxide or hydroperoxide such as t-butyl hydroperoxide. The reducing agent used in the redox system is zinc fornaldehyde sulfoxylate, sodium formaldehyde sulfoxylate, ascorbic acid, isoascorbic acid, sodium metabisulfite and the like. A preferred redox type system consists of t-butyl hydroperoxide and zinc formaldehyde sulfoxylate. The aqueous latex emulsions which form the basis of the pressure sensitive adhesives of the present invention are prepared in a single stage synthesis with or without a seed in the reaction vessel prior to beginning the monomer feed. Reaction temperatures during the monomer feed can range from about 50° C. to about 90° C. In a preferred method of preparing the aqueous latex a pre-emulsion, an aqueous solution of the initiator, and an aqueous solution of a reducing agent are prepared in separate vessels. A reaction vessel is charged with deionized water, an anionic surfactant and a predetermined amount of initiator. The mixture in the reaction vessel is heated with stirring and up to 20 wt % of the pre-emulsion, more preferably up to 8 wt % and most preferably 4 wt % is added to the reaction vessel along with a predetermined amount of the reducing agent to form the seed. In small batches such as laboratory size synthesis the predetermined amount of reducing agent, the "initial Zn hit", can be added before the initial pre-emulsion charge. In larger scale synthesis it is preferred that the predetermined amount of reducing agent is added after the initial pre-emulsion charge is added to the reaction vessel. After forming the seed, the contents of the reaction vessel are heated to a desired temperature and the pre-emulsion, initiator and the reducing agent are simultaneously metered into the reaction vessel with stirring. It has been found to be advantageous to mix the pre-emulsion and initiator. This can be accomplished by merging the pre-emulsion and initiator feed streams and passing the merged stream through a static mixer or by simply allowing the two feed streams to converge in a common feed line. On completion of the pre-emulsion feed, the contents of the reaction vessel are cooled and alternating predetermined amounts of the initiator and reducing agent are added to the reaction vessel with stirring. This alternating initiator/reducing agent addition is preferably performed at least once. Once the reaction is complete the pH may be adjusted. The pH of the aqueous latex emulsion is preferably adjusted to a pH of about 6 to about 9 and more preferably about 6 to about 7.5. For efficiency and economy an aqueous solution of ammonium hydroxide can be used to adjust the pH. Other bases that may be used include amines, imines, alkali metal and alkaline metal hydroxides, carbonates, etc.

In addition to the aqueous latex emulsion, the pressure sensitive adhesive composition advantageously contains biocides, wetting agents, defoamers, etc. Examples of suitable biocides include Kathon LX, commercially available as a 1.5% solution from Rohm & Haas and Metatin 910, commercially available from ACIMA. An example of a suitable wetting agent is Surfynol SE commercially available from Air Products, PLURONIC® type polyols commercially available from BASF Corp, and the like. Examples of defoamers include Drewplus T-1201 and Drewplus 1-191 commercially available from Ashland Speciality Chemical Company and Rhodoline 6681, commercially available from Rhodia.

The pressure sensitive adhesives described above can be used to prepare articles such as tapes, labels, signs, marking films and the like. In a typical construction the pressure sensitive adhesive is coated or otherwise applied to a release liner such as a siliconized paper, dried and laminated to a facestock. Alternatively, the pressure sensitive adhesive is coated directly on a facestock. Examples of facestock include cellulosics, metal foils, polycarbonates, polyethylene, polypropylene, polyethylene terephthalate and vinyl films.

The pressure sensitive adhesives typically have a viscosity after adjusting the pH to between about 6 and about 8 of from about 1,000 to about 20,000 centipoise. The pressure sensitive adhesives exhibit a shear-thinning rheology such that it allows coating even on difficult to coat films. Conventional coating techniques can be used to apply the pressure sensitive adhesives. Such techniques include dipping, slot die, air knife, brush curtain, extrusion blade, reverse roll, squeeze roll coating and the like. The following examples illustrate the invention and should not be construed as limiting in nature. In the examples particle sizes were determined using a COULTER® LS particle size analyzer. Test procedures were as follows:

1. 180° Peel Test: PSTC-1 (November 1975) Results of this test are reported in pounds/inch.
2. 178° Shear Test: modified PSTC-7(November 19975) Results of this test in Table IV are reported in hours/4 lbs./1 in$^2$ at 23° C.

tBHP is tertiary-butylhydroperoxide
2EHA is 2-ethylhexyl acrylate
βCEA is beta-carboxyethyl acrylate
ZnFS is zinc formaldehyde sulfoxylate

Having thus described the invention the following examples are for illustrative purposes and should not be construed as limiting.

EXAMPLES

Examples 1–4 were prepared according to the following general procedure. Table I lists weight % of components present in the aqueous latex emulsion based on the total weight of the emulsion. Table II lists weight % of the monomers based on the total weight of the monomer mixture. Table III lists variations in the preparation procedure of each of the examples and the mean particle size diameter in each latex emulsion.

In each of the examples a pre-emulsion was formed by mixing deionized water, a buffer, a portion of the anionic surfactant and the combined monomer charge. The reaction vessel was charged with deionized water, the remainder of the anionic surfactant and a predetermined amount of the initiator and heated to within ten degrees Celsius of the desired reaction temperature. A percentage of the pre-emulsion, up to 20 wt %, was charged to the reaction vessel. A predetermined amount of an aqueous solution of the reducing agent was added to the reaction vessel. Heating was continued up to the desired reaction temperature and the pre-emulsion, initiator, and reducing agent feeds were simultaneously begun. After the pre-emulsion, initiator, and reducing agent feeds were completed additional pre-determined amounts of initiator and reducing agents were added sequentially. The reaction mixture was optionally cooled and a second sequential addition of initiator and reducing agent was made. The aqueous latex emulsion was cooled to about 30° C. At this point the pH was adjusted and optional components such as defoamers, wetting agents, and biocides added to complete the pressure sensitive adhesive package.

TABLE 1

|  | Ex. 1 | Ex. 2 | Ex. 3 | Ex. 4 |
|---|---|---|---|---|
| water | 49.18 | 51.60 | 51.60 | 51.60 |
| Na Bicarb | 0.10 | 0.09 | 0.09 | 0.09 |
| EP-110 | 3.73 | 3.55 | 3.55 | 3.55 |
| 70% tBHP | 0.19 | 0.18 | 0.18 | 0.18 |
| 2EHA | 30.02 | 28.61 | 26.79 | 26.79 |
| Styrene | 13.33 | 12.69 | 14.51 | 14.51 |
| β-CEA | 3.33 | 3.17 | 3.17 | 3.17 |
| ZnFS | 0.12 | 0.11 | 0.11 | 0.11 |
|  | 100.00 | 100.00 | 100.00 | 100.00 |

TABLE II

|  | Ex. 1 | Ex. 2 | Ex. 3 | Ex. 4 |
|---|---|---|---|---|
| 2EHA | 64.32 | 64.32 | 60.25 | 60.25 |
| Styrene | 28.55 | 28.55 | 32.62 | 32.62 |
| β-CEA | 7.13 | 7.13 | 7.13 | 7.13 |
|  | 100.00 | 100.00 | 100.00 | 100.00 |

TABLE III

|  | Ex. 1 | Ex. 2 | Ex. 3 | Ex. 4 |
|---|---|---|---|---|
| % seed | 8 | 8 | 8 | 4 |
| temp C. | 50 | 60 | 80 | 80 |
| Surfactant split* | 2.98/0.75 | 2.84/0.71 | 2.84/0.71 | 2.84/0.71 |
| initial Zn hit | Before initial pre-emulsion charge | Before initial pre-emulsion charge | Before initial pre-emulsion charge | After initial pre-emulsion charge |
| particle size, nm | 79.0 | 80.0 | 88.9 | 83.0 |

*wt % of surfactant in pre-emulsion/reaction vessel

Peel and Shear 15 minute and 24 hour peel tests and shear tests were run on samples of films coated with compositions of examples 1, 2, 3, and Comparative Example A (a pressure sensitive adhesive based on an aqueous latex used in clear label applications and available as a precoated polymer film). The films for Examples 1, 2 and 3 were prepared as follows. A 2 mil wet film was drawn down with a Baker bar onto silicone treated 2 mil polyester. The film was dried at 90° C. for 5 minutes resulting in a 0.7 to 0.9 mil dry film. This was then laminated to 2 mil polypropylene. Results are given in Table IV.

TABLE IV

|  | Ex. 1 | Ex. 2 | Ex. 3 | Comparative Ex. A |
|---|---|---|---|---|
| 15 min peel | 2.0 | 2.1 | 2.8 | 1.7 |
| 24 hr peel | 3.1 | 1.5 | 2.65 | 2.4 |
| 1 × 1 × 4 lb shear | 47.3 | 23.4 | 40.23 | 100+ |
| Visc. cps (Brook #4 @ 10 rpm) | ~20,000 | ~2,500 | ~3,000 | * |
| pH | 7.5 | 8.0 | 8.1 | ** |

*Comparative Example A is supplied as a film
**no pH measurement available

Particle Size

Samples were taken from the reaction vessel during the pre-emulsion feed of Example 4 at 1 hour, 2 hours, 3 hours and after the latex emulsion was completed. Particle size determinations were made on each sample. The results are given in Table V.

TABLE V

Volume Statistics (Arithmetic)
Calculations from 0.40 µm to 2,000 µm

Ex. 4 - 1 hr

| | | | |
|---|---|---|---|
| Volume | 100.0% | | |
| Mean: | 0.0727 µm | S.D.: | 0.017 µm |
| Median: | 0.0709 µm | | |
| Mean/Median Ratio: | 1.025 | | |
| Specific Surf. Area | 871,328 cm$^2$/ml | | |
| % < | 10 | 25 | 50 | 75 | 90 |
| Size µm | 0.0517 | 0.0599 | 0.0709 | 0.0836 | 0.0964 |

Ex. 4 - 2 hr

| | | | |
|---|---|---|---|
| Volume | 100.0% | | |
| Mean: | 0.0790 µm | S.D.: | 0.020 m |
| Median: | 0.0770 µm | | |
| Mean/Median Ratio: | 1.026 | | |
| Specific Surf. Area | 809,146 cm$^2$/ml | | |
| % < | 10 | 25 | 50 | 75 | 90 |
| Size µm | 0.0544 | 0.0640 | 0.0770 | 0.0921 | 0.107 |

Ex. 4 - 3 hr

| | | | |
|---|---|---|---|
| Volume | 100.0% | | |
| Mean: | 0.0846 µm | S.D.: | 0.22 µm |
| Median: | 0.0829 µm | | |
| Mean/Median Ratio: | 1.021 | | |
| Specific Surf. Area | 758,851 cm$^2$/ml | | |
| % < | 10 | 25 | 50 | 75 | 90 |
| Size µm | 0.0574 | 0.0682 | 0.0829 | 0.0993 | 0.114 |

Ex. 4 - Final

| | | | |
|---|---|---|---|
| Volume | 100.0% | | |
| Mean: | 0.0834 µm | S.D.: | 0.022 µm |
| Median: | 0.0815 µm | | |
| Mean/Median Ratio: | 1.024 | | |
| Specific Surf. Area | 770,832 cm$^2$/ml | | |
| % < | 10 | 25 | 50 | 75 | 90 |
| Size µm | 0.0563 | 0.0669 | 0.0815 | 0.0981 | 0.113 |

Rheology

The following components were added to the composition of Example 3 after the pH was adjusted to 8.1 with a 29% solution of ammonium hydroxide:

Kathon LX(15%) 0.15 wt %
Rhodoline 6681 0.02 wt %
Surfynol SE 0.50 wt %

Figure 2:
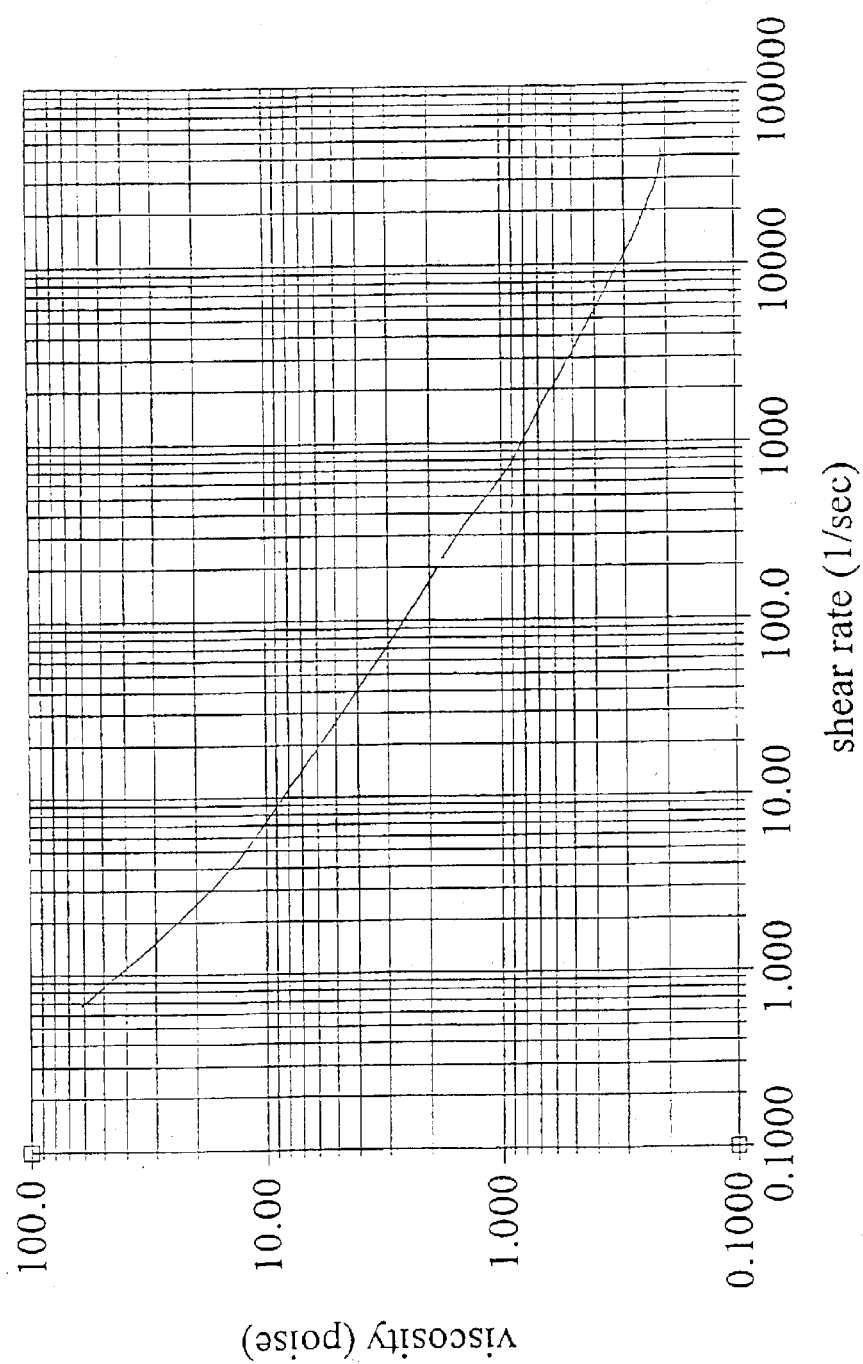
FIG. 2-is a graph that plots the rheology of the aqueous latex emulsion of Example 3 with a pH of 7.3 when subjected to continuous ramped shear rates as measured on a Carri-Med rheometer.

The composition was subjected to continuous ramped shear rates on a Carri-Med Rheometer. The results are given in FIG. 2.

Hot Water Lift Off and Water-Whitening Resistance Performance

Films were transfer coated using the compositions of Examples 1 and 2 on 2 mil polypropylene as described for the peel-shear examples. The coated films were cut into 1×2.5" rectangles and applied with light pressure to glass bottles. The films were rated for wetout and appearance on the bottles. For comparison purposes films were coated using the compositions of Examples 1, 2', (with a wetting agent), 2 (without additional wetting agent) and Comparative Example A. The results are given below.

| | Wetout 1–10 (10 = best) |
|---|---|
| Example 1 (high viscosity* no Surfynol SE) | 7 |
| Example 2' (lower visc*. 0.5 wt % Surfynol SE) | 8 |
| Example 2 (lower visc.* no Surfynol SE) | 6 |
| Comparative Example A | 6 |

*Viscosities are given in Table IV 4 hours after labels were applied the bottles were sprayed for ten minutes with 140°F. water.

| Elapsed Time | Results |
|---|---|
| ~5 min. | Ex. 1 and Comparative Ex. A edges of labels lifting |
| 5:40 min. | Ex. 1 label washed off |
| 7:00 min. | Comparative Ex. A label washed off, edges of Ex. 2 label lifting |
| 8:00 min. | Ex. 2 label washed off |
| 10:00 min. | Ex. 2' label intact |

After the hot water spray the remaining bottle with a label was put in an ice bath over night. The next day the bottle was rated for appearance. The film of Ex. 2' remained clear and had good adhesion to the bottle.

We claim:

1. A laminate comprising
   A) a substrate
   B) a facestock, and
   C) and between the substrate and facestock a pressure sensitive adhesive that maintains adhesion in hot water in addition to exhibiting enhanced resistance to water-whitening comprising; an aqueous latex emulsion prepared from a monomer mixture consisting essential of;
   a) at least one alkyl acrylate having at least 4 carbon atoms in the alkyl,
   b) at least one ethylenically unsaturated carboxylic acid or its corresponding anhydride, and
   c) at least one styrenic monomer,
   in the presence of an anionic surfactant and redox type free radical initiator system, where the latex emulsion has an average particle size diameter of less than or equal to about 100 nm.

2. The laminate as claimed in claim 1, where the alkyl acrylate having at least 4 carbon atoms in the alkyl is butyl acrylate, 2-ethylhexyl acrylate, heptyl acrylate, octyl acrylate, isooctyl acrylate, isobutyl acrylate, isodecyl acrylate or mixtures thereof.

3. The laminate as claimed in claim 1, where the ethylenically unsaturated carboxylic acid or its corresponding anhydride is acrylic acid, methacrylic acid, beta-carboxylethyl acrylate, maleic acid, fumaric acid, itaconic acid, maleic anhydride, or mixtures thereof.

4. The laminate as claimed in claim 1, where the styrenic monomer is styrene, tert-butyl styrene, dimethyl styrene, vinyl toluene, or mixtures thereof.

5. The laminate as claimed in claim 1, where the anionic surfactant is salts of sulfated nonyl and octyl phenoxy poly (polyethylenoxy) ethanols, lauyl ether sulfates, salts of dodecyl benzene sulfonate, or mixtures thereof.

6. The laminate as claimed in claim 1, further comprising; a wetting agent.

7. The laminate as claimed in claim 1, where the facestock is comprised of a cellulosic, metal foil, polycarbonate, polyethylene, polypropylene, polyethylene terephthalate or a vinyl film.

8. The laminate as claimed in claim 1, where the facestock is a tape.

9. The laminate as claimed in claim 1, where the facestock is a label.

10. The laminate as claimed in claim 1, where the facestock is a sign.

11. The laminate as claimed in claim 1, where the facestock is a marking film.

* * * * *